United States Patent [19]

Kennedy

[11] 4,321,495

[45] Mar. 23, 1982

[54] ROTARY PULSE GENERATOR

[75] Inventor: Paul L. Kennedy, Meriden, Conn.

[73] Assignee: Veeder Industries, Inc., Hartford, Conn.

[21] Appl. No.: 246,607

[22] Filed: Mar. 23, 1981

Related U.S. Application Data

[63] Continuation-in-part of Ser. No. 142,077, Apr. 21, 1980.

[51] Int. Cl.³ .............................................. H02K 21/12
[52] U.S. Cl. .................................... 310/156; 310/257; 322/62; 324/174
[58] Field of Search ............... 310/168, 169, 170, 156, 310/75 R, 194, 159, 171, 257; 322/49, 51, 62; 324/173, 174, 163

[56] References Cited

U.S. PATENT DOCUMENTS 3,504,208 3/1970 Rivers .................................. 310/156
3,551,711 12/1970 Davis .................................. 310/156

Primary Examiner—J. V. Truhe
Assistant Examiner—Morris Ginsburg
Attorney, Agent, or Firm—Prutzman, Kalb, Chilton & Alix

[57] ABSTRACT

A vehicle transmission mounted pulse generator module having a through drive shaft for driving a conventional speedometer cable, a rotor permanent magnet driven by the shaft with predetermined angular freedom therebetween for magnetically indexing the rotor magnet for useable signal generation at low speeds and a coaxial pickup coil assembly encircling the shaft and axially offset from the rotor magnet and compactly mounted with the rotor magnet within a housing sleeve inserted within a transmission housing bore to be driven for generating a pulse for each predetermined increment of travel of the associated vehicle.

7 Claims, 2 Drawing Figures

ROTARY PULSE GENERATOR

DESCRIPTION

This is a continuation-in-part of application Ser. No. 142,077, filed Apr. 21, 1980.

TECHNICAL FIELD

The present invention relates to a new and improved rotary pulse generator having notable utility as a vehicle speedometer and/or odometer drive module adapted to be mounted on a transmission housing in place of a conventional speedometer cable drive unit.

DISCLOSURE OF INVENTION

It is a principal aim of the present invention to provide a new and improved vehicle pulse generator module adapted to be mounted in place of a conventional speedometer cable drive unit to be driven to generate a train of electrical pulses with a pulse for each predetermined increment of travel of the associated vehicle.

It is another aim of the present invention to provide a new and improved vehicle pulse generator module which provides both an electrical output pulse train and a rotary mechanical output for driving a vehicle speedometer cable or the like.

It is another aim of the present invention to provide a new and improved transmission mounted pluse generator module which is compact in construction and design and which provides for mounting the operating parts of the pulse generator entirely within the usual transmission housing mounting bore originally provided for a speedometer cable drive unit. In accordance with the present invention, the pulse generator module has a housing sleeve adapted to be inserted within a standard transmission housing mounting bore and an electromagnetic pulse generator compactly mounted within that sleeve and thereby protected from road hazards and other external damage by both the pulse generator housing sleeve and the transmission housing.

It is another aim of the present invention to provide a new and improved rotary pulse generator which provides a relatively high peak-to-peak voltage output signal even at very low RPM.

It is a further aim of the present invention to provide a new and improved rotary pulse generator which provides "zero speed" resolution and the same predetermined finite number of output pulses for each revolution of the pulse generator irrespective of its rate of rotation.

It is a further aim of the present invention to provide a new and improved rotary pulse generator adapted to be manufactured at low cost on a mass production basis to have a long useful service-free life.

It is another aim of the present invention to provide a new and improved rotary pulse generator of the type having a rotary permanent magnet and a pickup coil assembly which generates an electrical pulse for each predetermined increment of rotation of the rotor. In accordance with the present invention, the pulse generator has a new and improved permanent magnet rotor structure which generates a strong output signal even at low rotor RPM and which minimizes permanent magnet oscillation and the resultant generation of spurious pulses.

Other objects will be in part obvious and in part pointed out more in detail hereinafter.

A better understanding of the invention will be obtained from the following detailed description and the accompanying drawing of the illustrative application of the invention.

BEST MODE FOR CARRYING OUT THE INVENTION

Figure 1:
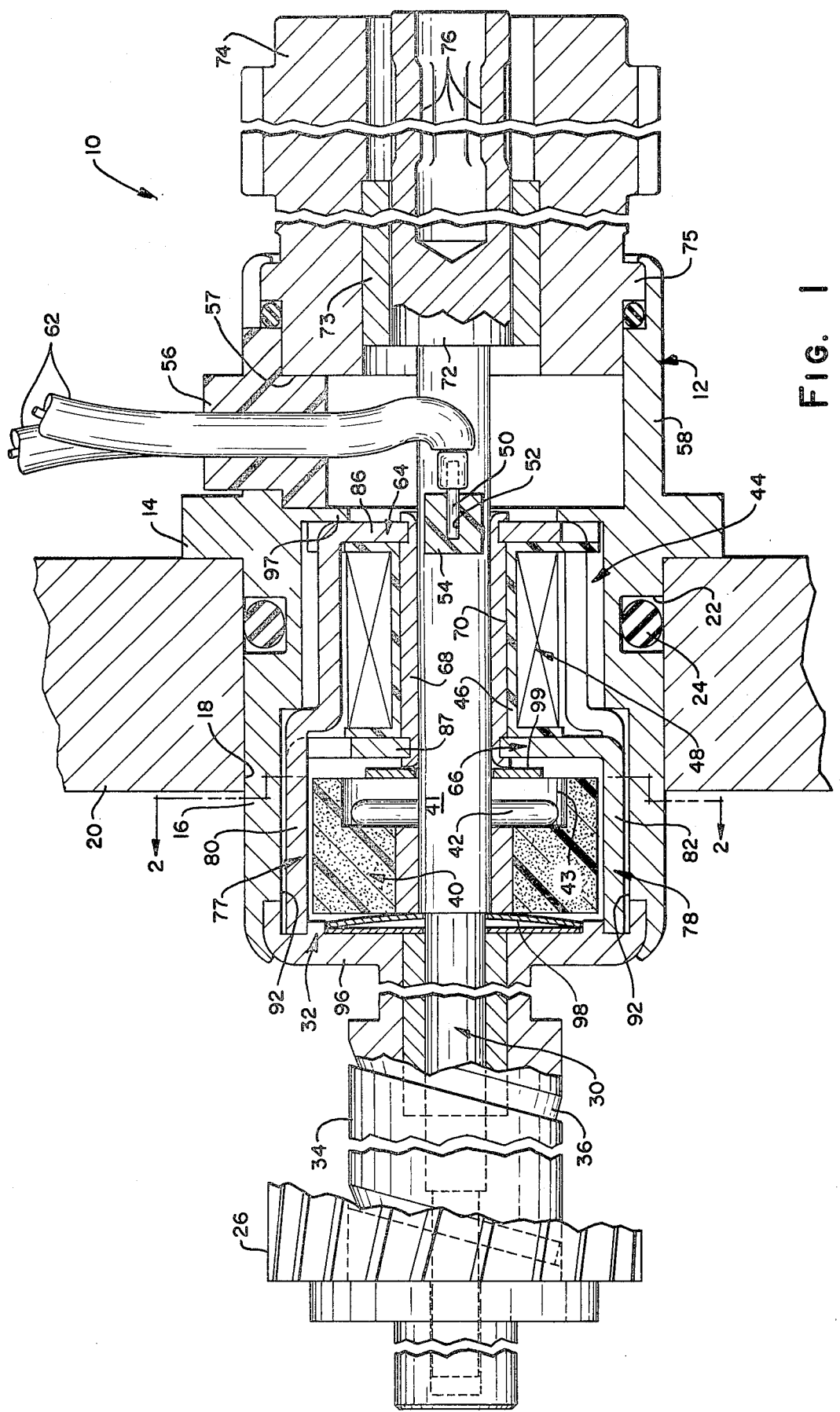
FIG. 1 is an axial section view, partly broken away and partly in section, showing a rotary pulse generator module incorporating an embodiment of the present invention mounted within a bore of a transmission housing.

Referring now to the drawing in detail wherein like numerals represent like parts throughout, a pulse generator module 10 incorporating an embodiment of the present invention is shown comprising a generally cylindrical housing 12 having a peripheral circular radial flange 14 and an inner generally cylindrical sleeve section 16 which together provide for installing the pulse generator within a cylindrical bore 18 of a vehicle transmission housing 20 with the flange 14 engaging its outer surface. The inner sleeve section 16 is formed with a peripheral annulus 22 for receiving a suitable O-ring 24 for sealing the transmission housing bore 18, and suitable fasteners (not shown) are provided for securing the peripheral flange 14 to the transmission housing. The housing 12 is preferably molded of a zinc alloy or a suitable plastic capable of withstanding the maximum operating temperature of up to 300° Fahrenheit of conventional automatic transmissions. Also, the O. D. of the inner sleeve section 16 is preferably approximately 0.8725 inches so that the pulse generator module 10 can be inserted as shown in a standard transmission bore 18 originally provided for a speedometer cable connector unit (not shown). In addition, a conventional helical drive gear 26 of the pulse generator module 10 is located so that the pulse generator module 10 can be easily substituted for a conventional speedometer cable drive unit (not shown) without modification of the transmission.

A pulse generator drive shaft 30 is coaxially mounted within an inner housing cap 32 that is suitably secured to the inner end of the cylindrical housing 12. The inner housing cap 32 has an enlarged inner generally cylindrical end 34 with a left-hand helical groove 36 (extending helically from the end of the cap in the counterclockwise direction as viewed from the inner end of the pulse generator). The helical drive gear 26 is rotated (in the counterclockwise direction as viewed from the inner end of the pulse generator) and cooperates with the helical groove 36 to provide an oil slinger for preventing passage of oil to the drive shaft 30 and into the housing cavity. The helical drive gear 26 is keyed for rotating the pulse generator drive shaft 30 and is driven by the usual speedometer cable drive gear (not shown) of the transmission to rotate the pulse generator drive shaft 30 in accordance with the rotation of the associated vehicle drive shaft (not shown) and therefore the speed of the vehicle. Preferably, the drive shaft 30 is geared to be rotated one thousand revolutions for each vehicle mile and therefore one revolution for each one-thousandth of a mile travelled by the vehicle.

Figure 2:
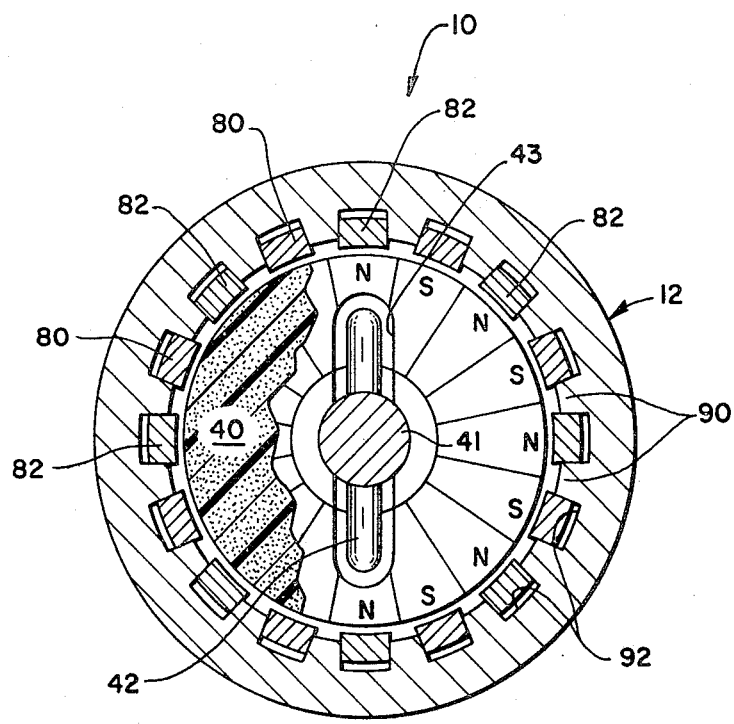
FIG. 2 is an enlarged transverse section view, partly broken away and partly in section, of the rotary pulse generator taken substantially along line 2—2 of FIG. 1.

A cylindrical permanent magnet 40 is mounted on an intermediate section 41 of the drive shaft 30 to be rotated by the drive shaft 30 via a diametral drive pin 42 fixed within a diametral bore in the shaft 30 and received within a diametral slot 43 in the permanent magnet 40. The permanent magnet 40 is therefore rotated by the drive shaft 30 at a speed proportional to the speed of the associated vehicle. For example, the permanent magnet 40 is molded from a thermoplastic material having magnetically oriented barium ferrite particles. As shown in FIG. 2, the rotor permanent magnet 40 is magnetized with sixteen equiangularly spaced peripheral poles of alternating north and south polarity. As will be more clearly understood from the description hereinafter, the permanent magnet 40 provides for generating eight pulse cycles per revolution or eight thousand pulse cycles per mile with each pulse cycle comprising two pulses of opposite polarity.

A pulse generator pickup subassembly 44 is mounted within the inner housing sleeve section 16 in cooperation with the permanent magnet 40. The pickup subassembly 44 comprises a circular coil bobbin 46 and a coil 48 wound on the bobbin 46 and having leads wound around terminals 50 inserted into openings 52 in diametrically opposed terminal mounting lugs 54 at the outer axial end of the bobbin 46. A rubber grommet 56 is mounted within a radial opening 57 in an outer generally cylindrical sleeve section 58 of the housing 12 and suitable electrical output leads 62 are mounted within laterally spaced openings in the grommet 56 with their inner ends electrically connected to the coil terminals 50.

A pair of coaxial pole pieces 64,66 are held against the opposite axial ends of the bobbin 46 by an axially extending cylindrical sleeve 68 mounted within a central opening 70 in the bobbin 46. The sleeve 68 forms a central axially extending core and has reduced end sections for receiving the two pole pieces 64,66 and which are flared outwardly against the pole pieces 64, 66 for securing the pole pieces to the central core 68.

The central sleeve or core 68 also provides a clearance bore for the intermediate section 41 of the drive shaft 30 which extends through the pickup 44. Also, an outer enlarged end 72 of the drive shaft 30 is rotatably mounted via a sleeve bearing or bushing 73 within an outer generally cylindrical end cap 74 for the housing 12. The outer end cap 74 has an inner end section and a peripheral circular flange 75 received within conforming bores in the outer sleeve section 58 of the housing 12. An annular O-ring seal or the like is provided between an outwardly facing shoulder of the outer sleeve section 58 and the circular flange 75 of the outer end cap 74 to seal the internal cavity of the housing against foreign matter. Also, the outer end of the sleeve section 58 of the housing is turned or set inwardly into engagement with the outer end cap flange 75 to secure the end cap 74 in place.

The outer enlarged end 72 of the drive shaft is suitably formed to provide four internal flats 76 for receiving a conventional speedometer drive cable (not shown). Accordingly, the pulse generator module 10 provides both a through shaft output for driving a speedometer drive cable in a conventional manner and a pulse generator output (hereinafter more fully described) providing a pulse train with a pulse for each predetermined increment of rotation of the shaft 30. For example, the mechanical output can be employed for driving a speedometer cable in a conventional manner and the pulse generator output can be separately employed as a speed input to an electric control system of the vehicle provided for controlling the vehicle speed, fuel and air mixture, anti-skid braking, etc.

The pole pieces 64,66 have respective annular arrangements 77,78 of eight equiangularly spaced axially extending elongated pole fingers 80,82 respectively, which encircle the rotor permanent magnet. The two sets of pole fingers 80,82 are angularly spaced to provide an annular arrangement of sixteen equiangularly spaced poles of alternating polarity. Thus, each pole piece 64,66 is formed into a generally cup or basket shape having a central plate portion 86 or 87 providing a coil end face and an annular arrangement 77 or 78 of axially extending pole fingers 80 or 82 providing respective stator poles. Also, in the case of the outer pole piece 64, the eight axially extending pole fingers 80 have a first annular section surrounding the rotor 40 with a diameter equal to the diameter of the other annular pole set 78 and a second reduced annular section surrounding the coil 48 and having an outer diameter less than the outer diameter of the other annular section. The offset of the reduced annular section enables the inner housing sleeve section 16 to be made sufficiently thick to provide the O-ring annulus 22. Also, the inner housing sleeve section 16 is formed with internal lugs 90 and intermediate slots 92 inwardly of the annulus for receiving the pole fingers 80,82 and thereby angularly locate the stator poles. The inner ends of the pole fingers 80,82 engage a radial end flange 96 of the inner housing cap 32 and such that the pickup subassembly 44 is secured between an intermediate internal radial flange 97 of the housing 12 and the inner housing end cap 32. A light Belleville washer 98 is mounted between the inner cap end flange 96 and the permanent magnet 40 to lightly bias the permanent magnet 40 into engagement with a thrust washer 99 engaging the inner end of the pickup 44, thereby frictionally restraining the permanent magnet 40 against angular oscillation and holding it and its drive shaft 30 against axial end play.

As can be seen, the annular pickup coil 48 is mounted coaxially with the permanent magnet 40, and the two coaxial pole pieces 64,66 at the opposite axial ends of the coil 48 provide with the central sleeve 68 a ferromagnetic circuit for generating an electrical pulse in the coil 48 for each magnetic reversal produced by the rotating permanent magnet 40. With the disclosed annular arrangement of sixteen equiangularly spaced rotor poles and sixteen equiangularly spaced stator poles, a sixteen pulse AC output is generated for each revolution of the permanent magnet 40.

The shaft drive pin 42 and the diametral slot 43 in the permanent magnet 40 rovide a loose drive coupling having a predetermined angular play or freedom which permits predetermined but limited rotation of the permanent magnet 40 relative to its drive shaft 30. Such relative rotation is preferably approximately equal to but may be slightly less than one-half of the pole pitch of the stator pole fingers 80,82 (i.e., one-half the pole pitch of $22\frac{1}{2}°$ of the sixteen pole stator disclosed). As a result of such limited permanent magnet freedom, the pulse generator produces or generates a relatively high voltage output signal at very low RPM and even at "zero speed". In other words, a useable output signal is produced at low RPM which does not diminish as the RPM decreases to zero from some minimum uniform rate of rotation of both the shaft 30 and permanent magnet 40. The pulse generator therefore produces a finite number of useable output pulses for each revolution of the shaft 30 irrespective of its rate of rotation.

The "zero speed" pulse generation capability of the pulse generator results from a magnetic detent action between the permanent magnet 40 and the stator. The magnetic detent action ocurs at low shaft speeds and operates to magnetically index the permanent magnet 40 forwardly relative to its drive shaft 30 when the magnetic force of attraction between the poles of the permanent magnet and the poles of the stator shifts from the preceding or trailing stator poles to the succeeding or leading stator poles. The permanent magnet is thereby forwardly indexed at a sufficient angular rate to generate a useable output signal. The output signal level is independent to the shaft speed and is primarily dependent on the magnetic interaction between the stator and permanent magnet 40.

More particularly, as the drive shaft 30 rotates at a low speed (below the minimum speed of uniform or common rotation of the shaft 30 and permanent magnet 40), the drive pin 42 engages the rotor magnet 40 to rotate it in the same direction and at the same speed as the drive shaft 30. As the magnetic poles of the rotor magnet 40 approach the mid-points between soft iron stator poles 80,82, the tangential magnetic force of attraction between each rotor pole and the immediately trailing stator pole with which it was previously aligned diminishes. Eventually, as the rotor poles rotate beyond the mid-points between the stator poles, the permanent magnet field of each rotor pole switches from the preceding or trailing stator pole to the next succeeding or leading stator pole. The rotor magnet 40 is thereby accelerated or indexed forwardly relative to its drive shaft 30 at a rate sufficient to generate a useable output signal, and the drive shaft 30 lags behind the rotor magnet 40. After the rotor magnet poles rotate into alignment with the stator poles, the rotor comes to rest until it is re-engaged by the shaft drive pin 42.

At relatively high shaft speed, the magnetic detenting or indexing action does not occur, and the rotor magnet 40 and shaft 30 rotate together in unison. The minimum shaft speed at which the magnetic detecting or indexing action does not occur depends on the natural frequency of the rotor magnet indexing system and is primarily determined by the rotor magnet inertia and the magnetic coupling and friction damping forces on the rotor magnet. The frictional damping force is largely determined by the Belleville washer 98, and so the washer is selected to avoid undesirable oscillation of the rotor magnet 40 and yet to permit the described magnetic indexing action below a predetermined shaft speed where an acceptable pulse is generated without resort to the magnetic indexing or detenting action. Accordingly, undesirable rotor oscillation is minimized and spurious pulse generation is prevented.

It has been found that a relatively high peak-to-peak voltage signal of up to 1.0 volts or more is generated by the described magnetic detenting action when the drive shaft 30 is rotated at an extremely low rate of for example 2.7 RPM (equal to a vehicle speed of about 0.1 MPH when the pulse generator drive shaft 30 is rotated at a rate of one thousand revolutions per mile).

The rotor magnet 40 and pickup subassembly 44 are mounted substantially entirely within the transmission housing 20 to provide a very compact and mostly hidden unit and such that the operating parts of the pulse generator are protected by both the transmission housing 20 and the pulse generator housing 12 against road hazards and other external damage and are maintained at the relatively even internal temperature of the transmission and so as to avoid pulse signal variations and physical damage resulting from temperature variations.

As will be apparent to persons skilled in the art, various modifications, adaptations and variations of the foregoing specific disclosure can be made without departing from the teachings of the present invention.

I claim:

1. In a transmission mountable rotary pulse generator module useable in place of a conventional speedometer cable drive unit for generating a pulse for each predetermined increment of travel of an associated vehicle, comprising an elongated housing with a generally cylindrical sleeve section adapted to be mounted within a transmission housing bore, an elongated drive shaft generally coaxially mounted within the elongated housing being coupled at the inner end thereof for being rotated by the transmission and a pulse generator mounted within the housing and driven by the drive shaft for generating a train of pulses with a pulse for each predetermined increment of rotation of the drive shaft, the improvement wherein the drive shaft is a through shaft having an outer end coupling for rotating a drive cable, and wherein the pulse generator comprises a permanent magnet rotor, coaxially mounted on the drive shaft, having an even plurality of generally equiangularly spaced magnetic poles of alternating polarity, and a pickup mounted within the housing generally coaxially with the rotor axially outwardly thereof, the pickup having a coaxial annular coil and a stator core encircling the drive shaft, the stator core having a central core sleeve extending axially through the coil and encircling the drive shaft and two coaxial generally basket shaped pole pieces at opposite ends of the coil respectively, the two generally basket shaped pole pieces having alternating axially inwardly extending pole fingers respectively forming an annular arrangement of an even plurality of stator poles of alternating polarity adjacent the permanent magnet rotor for generating an AC coil output signal with the permanent magnet rotor.

2. In a rotary pulse generator module having a rotatable drive shaft, a permanent magnet rotor, coaxially mounted on the drive shaft, having an even plurality of generally equiangularly spaced magnetic poles of alternating polarity, and a pickup mounted in generally axially offset coaxial association with the permanent magnet rotor for generating a pulse for each predetermined increment of rotation of the drive shaft, the improvement wherein the drive shaft is a through shaft for being driven at one end thereof and having a drive coupling at its other end, and wherein the pickup comprises an annular coil and stator core encircling the drive shaft, the stator core having a central core sleeve extending axially through the coil and encircling the drive shaft and two generally basket shaped pole pieces at opposite ends of the coil respectively, mounted generally axially offset from and coaxially with the permanent magnet rotor, the two basket shaped pole pieces having alternating axially extending pole fingers respectively forming an annular arrangement of an even plurality of stator poles of alternating polarity adjacent the rotor for generating an AC coil output signal with the permanent magnet rotor.

3. A rotary pulse generator module according to claim 1 or 2 wherein the permanent magnet rotor is mounted on the drive shaft to have predetermined limited rotation relaive thereto for magnetically angularly indexing the rotor relative to the drive shaft through magnetic interaction of the rotor and stator poles when the drive shaft is rotating at a relatively low rate.

4. A rotary pulse generator module according to claim 3 wherein the said predetermined limited relative rotation of the rotor is approximately equal to one-half the pole pitch of the rotor.

5. A rotary pulse generator module according to claim 3 wherein the magnetic poles of the permanent magnet rotor and the stator poles have the same pole pitch.

6. In a rotary pulse generator having a rotatable drive shaft, a permanent magnet rotor, coaxially mounted on the drive shaft, having an even plurality of generally equiangularly spaced magnetic poles of alternating polarity, and a pickup mounted in association with the permanent magnet rotor having an annular arrangement of even plurality of stator poles of alternating polarity adjacent the rotor for generating a pulse for each predetermined increment of rotation of the drive shaft, the improvement wherein the permanent magnet rotor is mounted on the drive shaft to have predetermined limited rotation relative thereto for magnetically angularly indexing the rotor relative to the drive shaft through magnetic interaction of the rotor and stator poles when the drive shaft is rotating at a relatively low rate.

7. A rotary pulse generator according to claim 6 wherein the said predetermined limited relative rotation of the rotor is approximately equal to one-half the pole pitch of the rotor.

* * * * *